(12) United States Patent
Yeh

(10) Patent No.: US 6,694,837 B2
(45) Date of Patent: Feb. 24, 2004

(54) FORWARD/REVERSE TRANSMISSION FOR SCALE MODEL VEHICLE

(75) Inventor: Shi-Tang Yeh, Shi-Chih (TW)

(73) Assignee: Traxxas LP, Plano, TX (US)

( * ) Notice: Subject to any disclaimer, the term of this patent is extended or adjusted under 35 U.S.C. 154(b) by 0 days.

(21) Appl. No.: 10/120,193

(22) Filed: Apr. 9, 2002

(65) Prior Publication Data

US 2002/0148312 A1 Oct. 17, 2002

Related U.S. Application Data

(62) Division of application No. 09/422,993, filed on Oct. 21, 1999, now Pat. No. 6,367,345.

(51) Int. Cl.[7] .............................. F16H 3/14; F16D 23/10
(52) U.S. Cl. ..................................... 74/377; 192/105 C
(58) Field of Search ..................... 446/443; 192/105 C; 74/375, 376, 377, 333

(56) References Cited

U.S. PATENT DOCUMENTS

| | | | | | |
|---|---|---|---|---|---|
| 2,153,556 A | * | 4/1939 | Gartin | ....................... | 192/46 X |
| 2,999,397 A | * | 9/1961 | Walter | ......................... | 74/377 |
| 3,071,021 A | * | 1/1963 | Miller | ......................... | 74/377 |
| 3,479,895 A | * | 11/1969 | Wegener | ....................... | 74/333 |
| 3,589,486 A | * | 6/1971 | Kelch | ........................... | 192/46 |
| 4,924,720 A | * | 5/1990 | Shust | ........................... | 74/377 |
| 5,385,064 A | * | 1/1995 | Reece | ........................... | 74/331 |
| 5,387,052 A | * | 2/1995 | Artzberger | ................. | 74/61 X |
| 6,505,527 B2 | * | 1/2003 | Lu | ........................... | 446/443 X |

* cited by examiner

*Primary Examiner*—Roger Pang
(74) *Attorney, Agent, or Firm*—Dennis T. Griggs

(57) ABSTRACT

A forward/reverse transmission, shiftable under servo-control, includes a movable clutch bell and a free-wheeling, one-way centrifugal lock-out clutch that permits a gear change from forward to reverse or reverse to forward only while the engine is operating at or below idle speed. The centrifugal lock-out clutch includes a spring-loaded pawl which is yieldably biased by a compression spring and held in a non-interfering, shiftable position when the engine is being operated at or below idle speed. As the engine rpm increases above idle, the centripetal acceleration force overcomes the bias force of the compression spring and the pawl is extended radially outwardly for engagement with a torque transfer pin. In the radially extended position, the pawl is disposed for interference contact against the clutch bell housing, thus preventing clutch engagement/disengagement. In an alternative embodiment, the centrifugal lock-out clutch includes a pair of spring-loaded friction shoes which are biased in the retracted (non-interfering) position by torsion springs.

6 Claims, 7 Drawing Sheets

FORWARD/REVERSE TRANSMISSION FOR SCALE MODEL VEHICLE

CROSS-REFERENCE TO RELATED APPLICATIONS

This application is a divisional of U.S. application Ser. No. 09/422,993 filed Oct. 21, 1999. Now U.S. Pat. No. 6,376,345.

STATEMENT REGARDING FEDERALLY SPONSORED RESEARCH OR DEVELOPMENT

Not applicable.

BACKGROUND OF THE INVENTION

This invention relates generally to scale model racing vehicles, and in particular to radio-controlled model racing cars that are powered by miniature glow plug internal combustion engines.

Radio-controlled model racing is a popular hobby sanctioned by Radio-Operated Auto Racing, Inc., among other rule making organizations. Competition events feature model cars, model aircraft and model boats. Racing heats are generally staged on a closed-circuit race course and require each competing model to complete as many laps as possible within a specified time period, with the model completing the largest number of laps being declared the winner. Some racing events are conducted over an unimproved off-road outdoor area where the model car must be steered carefully to avoid collision with obstacles. When a collision occurs, it may be necessary to drive the model car in reverse to clear the obstacle before the race can be continued.

Each model is controlled in terms of steering, throttle and forward/reverse travel by low-power, digitally encoded radio-frequency command signals at a dedicated frequency generated by a hand-held remote control transmitter. Each model is equipped with an on-board servo and radio receiver that is tuned to the same frequency as the transmitter to cause the model to turn, increase speed, slow down and reverse direction as commanded by the operator.

There are two main categories of radio-controlled scale model vehicles, battery-powered and fuel-powered. The prime mover in a battery-powered vehicle is an electric motor, while the prime mover in a fuel-powered vehicle is an internal combustion engine. Since fuel-powered vehicles generally do not have an on-board electrical generating system, a small battery is included to provide electrical power for operating on-board radio system components. The on-board radio system components include a receiver and servo motors. Conventional battery-powered vehicles achieve reversal of the prime mover (electric motor) by reversing the polarity of the applied voltage. Conventional fuel-powered vehicles have no method for reversing the internal combustion engine, and thus are not operable in reverse.

One conventional radio-controlled scale model vehicle is equipped with an on-board battery and a DC electric motor for cranking the internal combustion engine during starting, and also for providing motive power during reverse travel operation. The internal combustion engine, which is not reversible, provides operating power for the model vehicle only during forward travel operation. The forward gear is disengaged and the engine is brought to idle under servo-control to permit transfer to the DC electric motor through a power transfer linkage and a reverse gear so that the model vehicle can be propelled by electrical power in the reverse direction.

It will be appreciated that the sequential shifting operation, which requires transition to idle speed, disengagement of the engine and engagement of the electric drive motor, imposes an undesirable time delay before the vehicle motion can be completely reversed. Additionally, if direction of travel is reversed while being operated at a high rate of speed, the gearing and/or power transfer linkage can be damaged.

Accordingly, there is a need for a simple, rapid and reliable means for selectively reversing the forward driving torque produced by a prime mover, for example an internal combustion engine or inertial flywheel motor that cannot be reversed, into reverse driving torque, thus eliminating the need for an on-board battery and electric drive motor for reverse travel. Additionally, a shiftable transmission is needed for use in combination with a radio-controlled scale model vehicle in which shifting from forward to reverse is performed without damaging the transmission gear train or linkage.

BRIEF SUMMARY OF THE INVENTION

According to the present invention, a radio-controlled model vehicle includes a shiftable transmission that is powered by a miniature internal combustion engine during both forward and reverse travel. The transmission includes a forward/reverse torque transfer assembly that is shiftable under the control of a servo-driven shuttle. The forward/reverse torque transfer assembly includes a shiftable clutch bell coupled to the shuttle and a centrifugal lock-out clutch that permits a gear change from forward to reverse or reverse to forward only while the prime mover (the internal combustion engine) is operating at or below idle speed. Drive train shock loading and damage to the transmission and its associated parts are avoided by preventing gear changes for any engine speed above idle.

According to one aspect of the invention, the centrifugal lock-out clutch includes a spring-loaded pawl which prevents gear change while the engine is being operated above a predetermined idle speed. For engine operation or at or below idle speed, the pawl is retracted by a bias compression spring to a non-engaging position. As the engine rpm increases above idle, the inertial force developed by centripetal acceleration overcomes the bias force of the compression spring and the pawl is extended radially outwardly for positive engagement against a torque transfer pin carried on the clutch bell, and driving torque is transmitted to the wheels.

Shifting movement of the shuttle and the clutch bell are prevented by interference contact of the inertially extended pawl against the clutch bell housing when the engine is operating at speeds above idle. Shuttle shifting and clutch engagement/disengagement are automatically enabled when the engine speed drops below idle, as the bias spring moves the pawl from the shift-blocking position into the retracted, non-interfering position, so that the clutch bell can be shifted into or away from the pawl engaging position.

According to another aspect of the invention, the centrifugal lock-out clutch includes a pair of spring-loaded friction shoes. At idle speed, the friction shoes are held in the retracted (non-interfering) position by torsion bias springs, and the clutch bell is free to either forward or reverse shift to an engagable torque transfer position over the friction shoes. As the engine rpm increases above idle, the inertial forces developed by centripetal acceleration overcome the yieldable restraining force of each torsion spring, thus extending the friction shoes radially outwardly into frictional engagement against the clutch housing and transferring driving torque to the wheels. The clutch bell cannot be disengaged and shifted from one position to the other as long as the engine rpm remains above idle.

In each embodiment, the position of the clutch bell in relation to the shoe/pawl inertial stop apparatus determines whether the clutch is permitted to engage/disengage the forward gear or the reverse gear. If the clutch bell is not positioned over a shoe or pawl and the engine is operating above idle rpm, the radial extension of the shoe/pawl blocks axial shifting movement of the shuttle and clutch bell. Consequently, for any engine speed above idle, a gear change from forward to reverse or reverse to forward is not allowed.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in connection with the appended claims and with reference to the attached drawing figures in which:

DETAILED DESCRIPTION OF THE INVENTION

Figure 1:
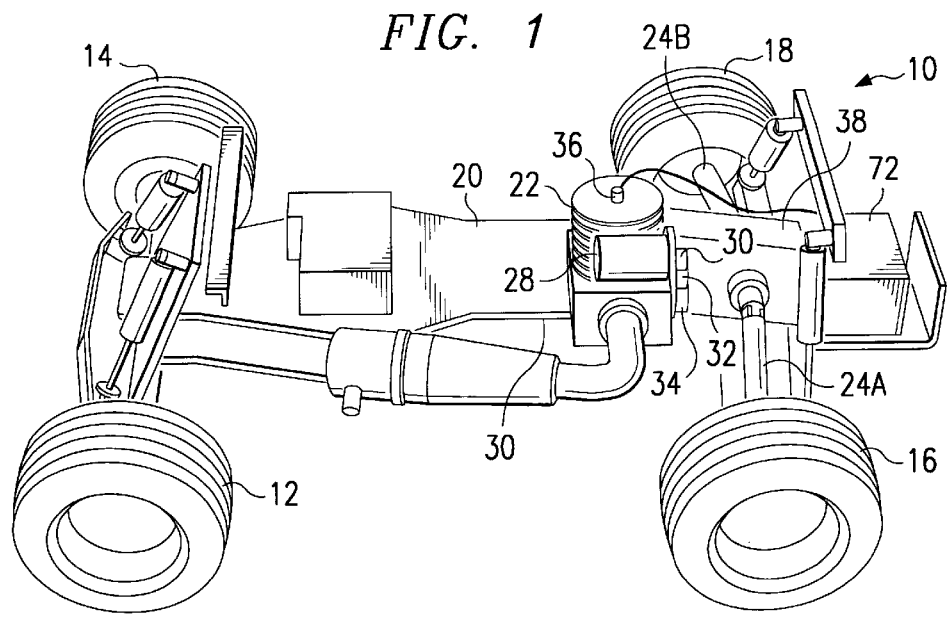
FIG. 1 is a perspective view of a radio-controlled scale model racing car that is powered by a miniature internal combustion engine.

Preferred embodiments of the invention will now be described with reference to various examples of how the invention can best be made and used. Like reference numerals are used throughout the description and several views of the drawing to indicate like or corresponding parts.

Referring now to FIG. 1, a scale model racing car 10 includes front steering wheels 12, 14 and rear driving wheels 16, 18 mounted on a chassis 20. The scale model racing car 10 is powered by a miniature fuel-burning internal combustion engine 22 which is a compression (glow-plug) or spark ignition engine having a displacement of 2.5 cc to 23.0 cc and providing a power output in the range of 0.5 h.p. to 5.0 h.p.

Figure 3:
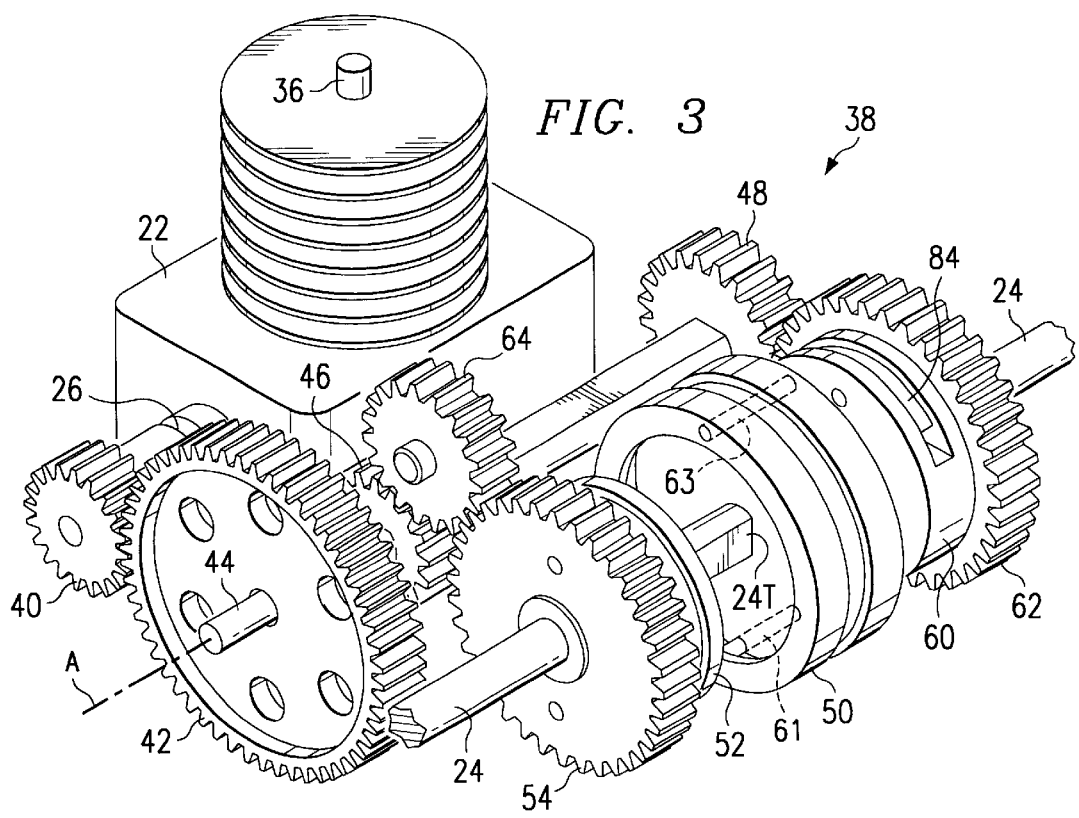
FIG. 3 is a perspective view of a forward/reverse transmission constructed according to a first preferred embodiment of the present invention.
Figure 2:
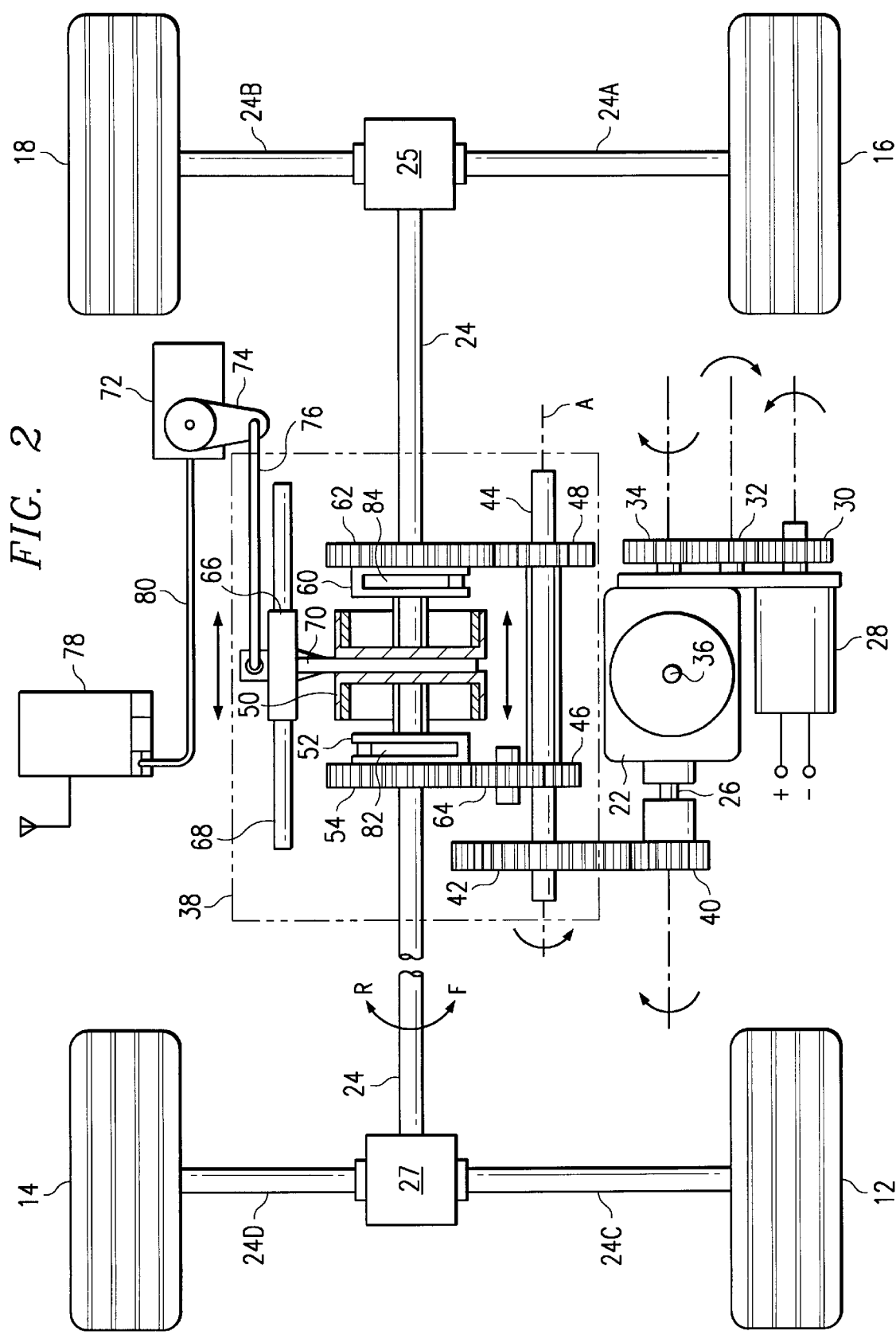
FIG. 2 is a simplified electro-mechanical block diagram of a servo-mechanism and gear train assembly.

Referring now to FIG. 2 and FIG. 3, the rear drive wheels 16, 18 are mechanically attached to output shaft stub sections 24A, 24B which are coupled to the output gears of a differential gear unit 25. The differential gear unit 25 is driven by a main drive shaft 24 which is capable of rotation in clockwise and counterclockwise directions, for propelling the rear wheels in the forward and reverse directions.

The main drive shaft 24 extends along the length of the model car and is connected at the front of the model car to a differential gear unit 27. The front wheels 12, 14 are connected to the output gears of the differential gear unit 27 by output shaft stub sections 24C, 24D, respectively.

The engine 22 is capable of powering the scale model racing car at speeds in the range of 20 mph to 80 mph. The output torque developed by the engine 22 is delivered through a power output shaft 26. As shown in FIG. 2, an onboard DC electric motor 28 is coupled by a pinion gear 30, an idler gear 32 and a spur gear 34 to the power output shaft 26 for starting the engine 22. According to this arrangement, the engine 22 includes a conductive glow plug connector 36 which, along with the DC electric motor 28, is connectable to an external DC electric power supply for cranking and starting the engine 22.

After starting, the external power supply is disconnected and the model car 10 is thereafter powered in the forward and reverse directions solely by the internal combustion engine 22. It will be appreciated that prime mover operation of the internal combustion engine 22 is not reversible, and the model car 10 does not carry an onboard battery pack for supplying operating power to the DC electric motor. Consequently, the model car is powered solely by the internal combustion engine 22 after starting for reverse as well as forward operation.

The rotary power output of the internal combustion engine 22 is applied to the rotatable main drive shaft 24 through a transmission assembly 38. Referring now to FIG. 2 and FIG. 3, the rotary output torque developed by the internal combustion engine 22 is applied to the transmission assembly 38 through an input pinion gear 40 which drives a primary input spur gear 42. The spur gear 42 is attached to a primary torque transfer shaft 44 which is mounted for rotation about its longitudinal axis A.

The rotary torque transmitted through the spur gear 42 to the torque transfer shaft 44 is selectively applied to the main drive shaft 24 through a forward drive spur gear 46 or a reverse drive spur gear 48 upon engagement with a clutch bell 50. The forward drive spur gear 46 and the reverse drive spur gear 48 are rigidly attached to opposite ends of the torque transfer shaft 44. Thus the rotary power output of internal combustion engine 22 can be selectively applied through either the forward drive spur gear 46 or the reverse drive spur gear 48, according to the shifted position of the clutch bell 50, as described below.

Referring again to FIG. 2, the rotary output torque produced by the internal combustion engine 22 is selectively converted to forward drive torque by a one-way pawl clutch 52 and a forward drive spur gear 54 which is attached to the clutch 52. The forward drive spur gear 54 and one-way forward clutch 52 are free-wheeling with respect to the main drive shaft 24, except when the clutch bell 50 is engaged with the clutch 52.

Figure 4:
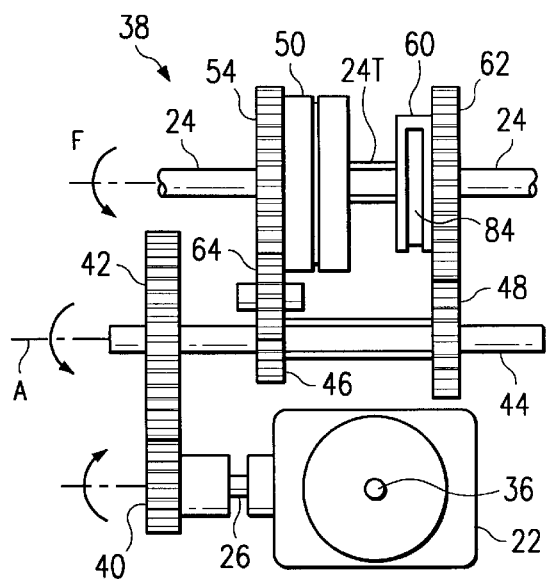
FIG. 4 is a top plan view thereof, with the clutch bell engaged in the forward drive position.
Figure 5:
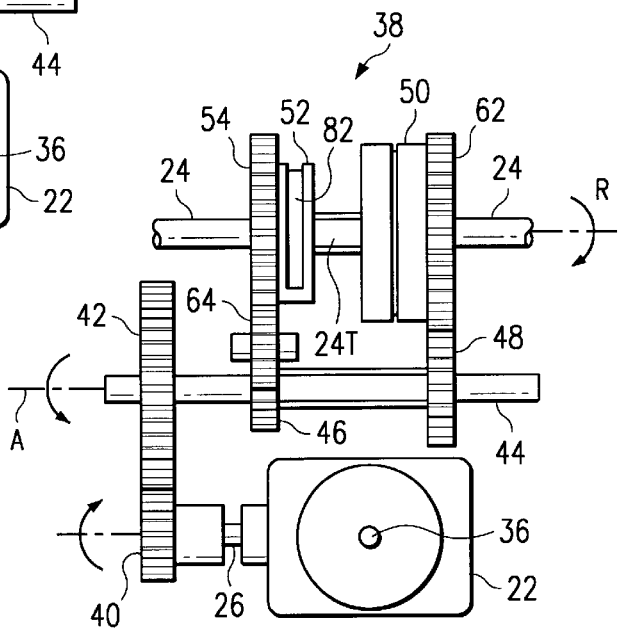
FIG. 5 is a view similar to FIG. 4, showing the clutch bell engaged in the reverse drive position.
Figure 8:
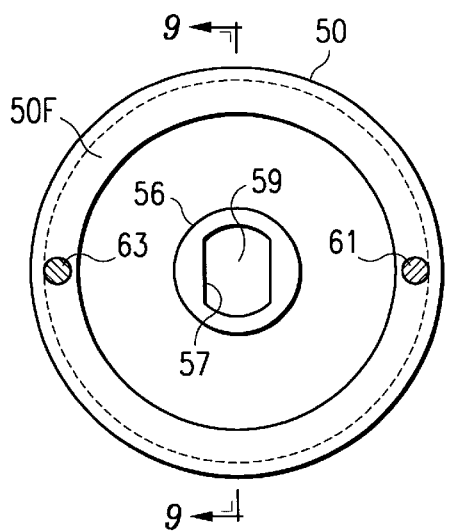
FIG. 8 is a right side elevational view of the clutch bell shown in FIG. 5.
Figure 9:
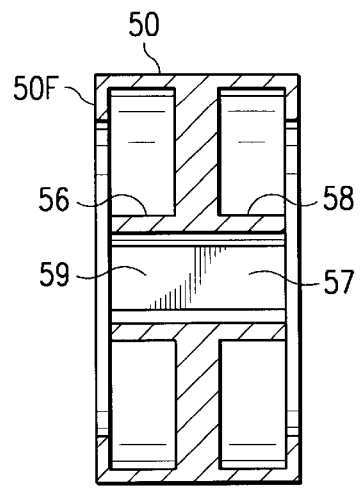
FIG. 9 is a sectional view of the clutch bell shown in FIG. 8.

Referring to FIG. 8 and FIG. 9, the clutch bell 50 includes shaft insert collar portions 56, 58 which are intersected by an axial bore 59 that has flat side faces 57 which are engagable with a conformed torque transfer shaft portion 24T of the main drive shaft. During shifting movement of the clutch bell 50, the insert collars 56, 58 ride on the torque transfer shaft portion 24T until the clutch bell 50 is carried into a position overlying the forward clutch 52 (FIG. 4) or the reverse clutch 60 (FIG. 5).

For forward travel operation, the clockwise output torque of the engine 22 is applied through the primary torque transfer shaft 44 to the main drive shaft 24 by an idler spur gear 64 which is meshed with the forward drive spur gear 46 and the forward output spur gear 54. According to this arrangement, counter-clockwise rotation of the torque transfer shaft 44 is converted into clockwise rotation of the main drive shaft 24, thereby producing forward (F) rotation of the front and rear wheels.

The rotary output torque produced by the internal combustion engine 22 is selectively converted to reverse drive torque by a one-way reverse clutch 60 and a reverse drive spur gear 62 which is attached to the reverse clutch 60. For reverse travel operation, the clockwise output torque of the engine 22 is applied through the torque transfer shaft 44 to the drive axle 24 by direct engagement of the reverse drive pinion 48 with the reverse drive spur gear 62. The one-way reverse clutch 60 and output spur gear 62 are free-wheeling with respect to the main drive shaft 24, except when the clutch bell 50 is engaged with the reverse clutch 60.

Referring now to FIG. 2, FIG. 4, FIG. 5 and FIG. 6, the clutch bell 50 is slidable along the main drive shaft 24 to the forward drive position (FIG. 4) in which the clutch bell is engaged with the forward clutch 52 for transmitting torque to the rotary axle in the forward direction, and is slidable to the reverse drive position (FIG. 5) in which the clutch bell is engaged with the reverse clutch 60 for transmitting torque to the torque transfer shaft 44 in the reverse direction. The clutch bell 50 is shiftable along the main drive shaft 24 by a servo-actuated shuttle 66. The shuttle is mounted for sliding movement along a guide rail 68, and is attached to the clutch bell 50 by a shift arm 70.

The shuttle 66 is driven by a battery-operated servo 72 which includes a rotary actuator arm 74. The shuttle 66 and the rotary actuator arm 74 are coupled together by a linking arm 76. The servo actuator arm shifts the shuttle 66 and clutch bell 50 between the forward and reverse positions in response to digitally encoded radio-frequency command signals received by a high frequency, multiple channel receiver 78. The receiver 78 decodes the radio command signals and outputs control signals (FORWARD and REVERSE) to the servo 72 through a multiple conductor signal cable 80.

According to an important feature of the invention, the forward clutch 52 and the reverse clutch 60 are equipped with spring-loaded pawls 82, 84, respectively (FIG. 6 and FIG. 7), that permit a gear change from forward to reverse or reverse to forward only while the internal combustion engine 22 is operating at or below idle speed. When the spring-loaded clutch pawls 82, 84 rotate outwardly in response to increased engine rpm, they mechanically engage torque transfer pins 61, 63 (FIG. 3 and FIG. 8), thereby mechanically connecting the forward drive spur gear 54, the forward clutch 52 and the clutch bell 50 into forward driving engagement with the main drive shaft 24. According to this arrangement, drive train shock loading and damage to the transmission and its associated gears are avoided by preventing gear changes for any engine speed above idle.

Figure 6:
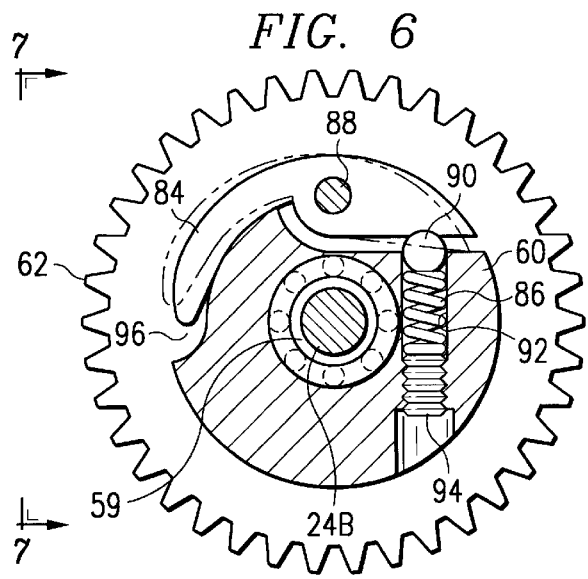
FIG. 6 is a front elevational view, partly in section, of a positive engagement clutch which incorporates a spring-loaded pawl.
Figure 7:
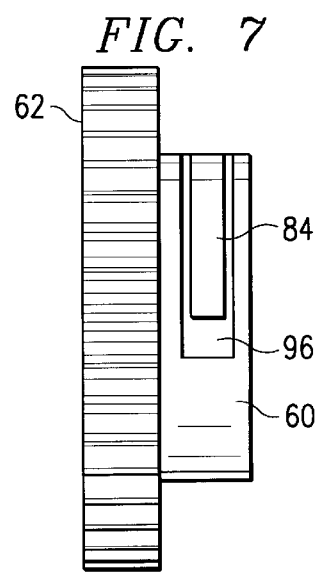
FIG. 7 is a right side elevational view of the positive engagement clutch and spring-loaded pawl embodiment taken along the line 7—7 of FIG. 6.

Referring now to FIG. 2, FIG. 6 and FIG. 9, for engine operation at or below idle speed, the pawl 84 is retracted by a bias compression spring 86 to a non-interfering position. As the engine rpm increases above idle, the force developed by centripetal acceleration overcomes the bias force of the compression spring and the pawl 84 rotates about a pivot pin 88 and is extended radially outwardly (to the dashed-line position) into driving engagement with one of the torque transfer pins 61, 63 and partially overlaps (in radial extent) the housing face 50F of the clutch bell 50. That is, shifting extension movement of the shuttle 66 into or out of engagement with the clutch 52 is prevented by interference contact of the inertially extended pawl 84 (in the dashed line blocking position) against the clutch housing 50F when the engine is operating at speeds above idle.

When the engine speed drops below idle, the centripetal force diminishes and is overcome by the bias spring 86 which moves the pawl 84 from the blocking/torque transfer position (as indicated by the dashed line) into the retracted, non-interfering shifting position as shown in FIG. 6. The bias restoring force of the compression spring 86 is applied through a ball-bearing 90 that is slidably received for reciprocal movement through a cylindrical bore 92 drilled through the clutch body 60. The ball-bearing 90 is captured between the compression bias spring 86 and the pawl 84. The magnitude of the restoring bias force developed by the compression spring 86 is adjusted by a set screw 94 to a level permitting the bias spring 86 to drive the pawl 84 to the fully retracted position (at idle speed) within a clutch slot 96, as indicated by the solid line position in FIG. 6 and FIG. 7.

According to an alternative embodiment as shown in FIGS. 10–14, each centrifugal lock-out clutch includes a pair of spring-loaded friction shoes 102, 104 and 106, 108, respectively, for frictional torque transfer engagement against the clutch bell 50. Torque transfer pins are not used in this embodiment. In this arrangement, each friction shoe is biased to the retracted position (as indicated by the solid lines in FIG. 13 and FIG. 14) by torsion springs 110 and 112, respectively. The torsion springs are fitted about retainer pins 114, 116, respectively. The radially inner end portions 110A, 112A of the torsion springs are received within retainer pockets 118, 120, respectively. The opposite end portions 110B, 112B are received within retainer slots formed across the outer periphery of each friction shoe.

Figure 10:
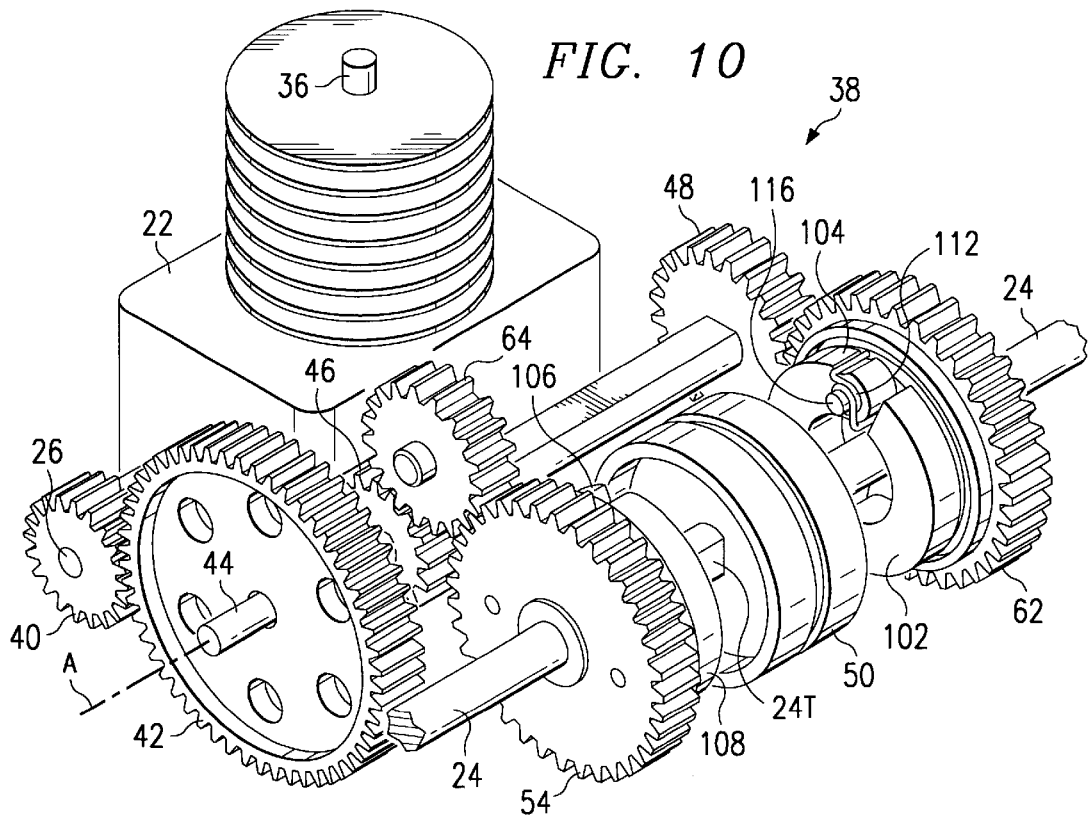
FIG. 10 is a perspective view of a power transmission including a friction clutch which utilizes spring-loaded friction shoes.
Figure 11:
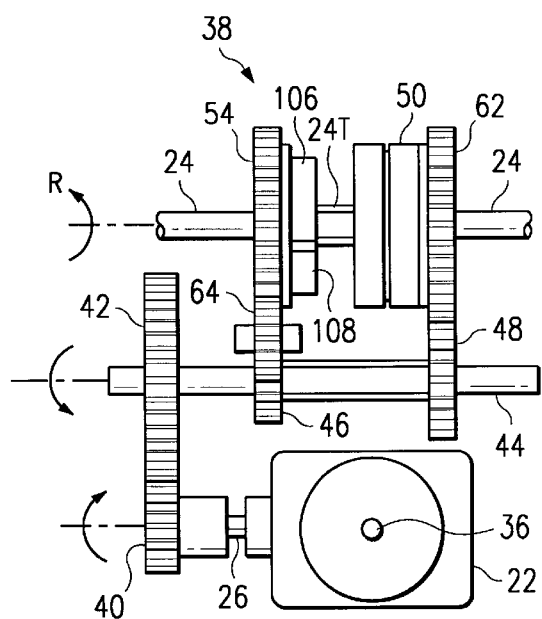
FIG. 11 is a top plan view thereof, with the clutch bell shifted and frictionally engaged in the reverse travel direction.
Figure 12:
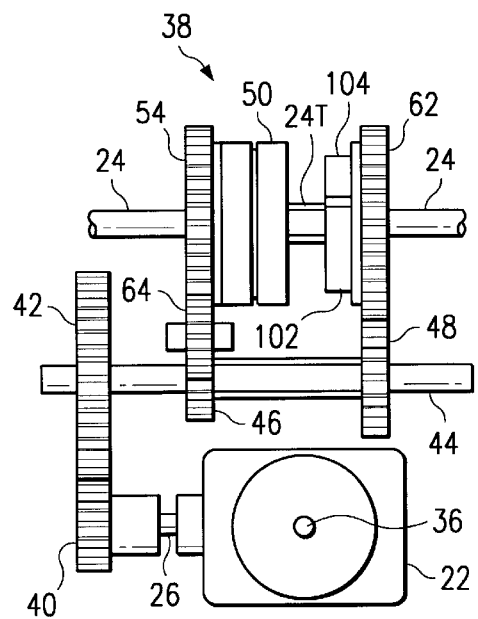
FIG. 12 is a view similar to FIG. 11 in which the clutch bell is shifted and frictionally engaged in the forward direction of travel.
Figure 13:
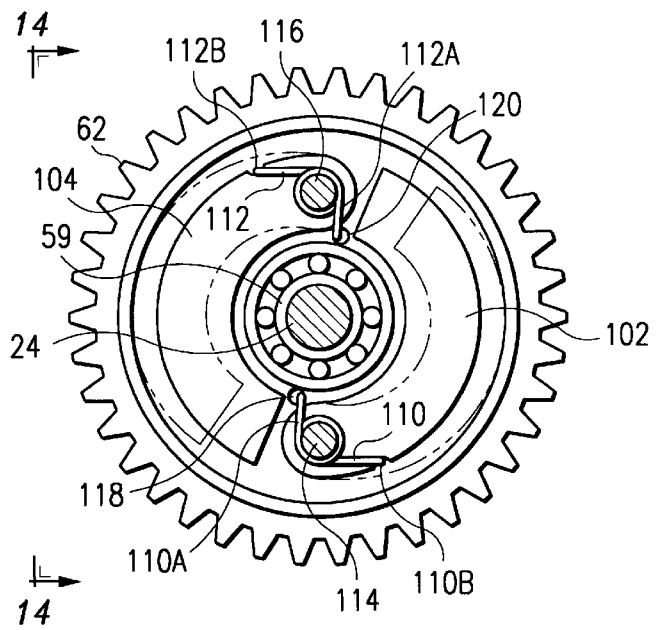
FIG. 13 is a side elevation view of an alternative embodiment of the centrifugal lock-out clutch, showing the spring-loaded friction shoes in elevation.
Figure 14:
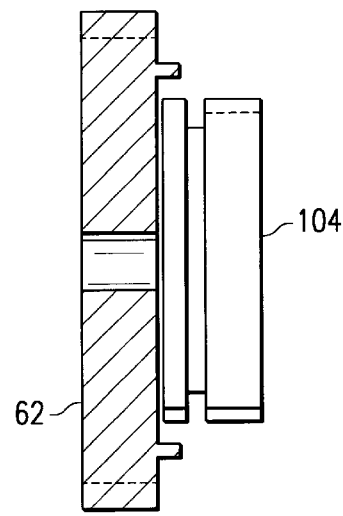
FIG. 14 is a simplified right side elevational view thereof, shown partly in section.

Referring to FIG. 10 and FIG. 13, for engine operation at or below idle speed, the friction shoes 102, 104 are retracted by the torsion springs 110, 112 to a non-interfering position. As the engine rpm increases above idle, the force developed by centripetal acceleration overcomes the bias force of the torsion springs 110, 112 and the friction shoes rotate about the pins 114, 116 and are extended radially outwardly (to the dashed line position) as the bias force of each torsion spring is overcome. As the friction shoes extend radially outwardly, each shoe engages the clutch bell 50 in frictional torque transfer contact, and also partially overlaps the housing face 50F of the clutch bell 50. Shifting movement of the clutch bell 50 is prevented by interference contact of the radially extended friction shoes 102, 104 (in the dashed line blocking position) against the bell housing 50F (FIG. 9) when the engine is operating at speeds above idle.

When the engine speed drops below idle, the centripetal force diminishes and is overcome by the bias force exerted by the torsion springs 110, 112 which moves each friction shoe from the radially extended position (as indicated by the dashed line) to the retracted, non-interfering position (as indicated by the solid line), as shown in FIG. 13.

Figure 15:
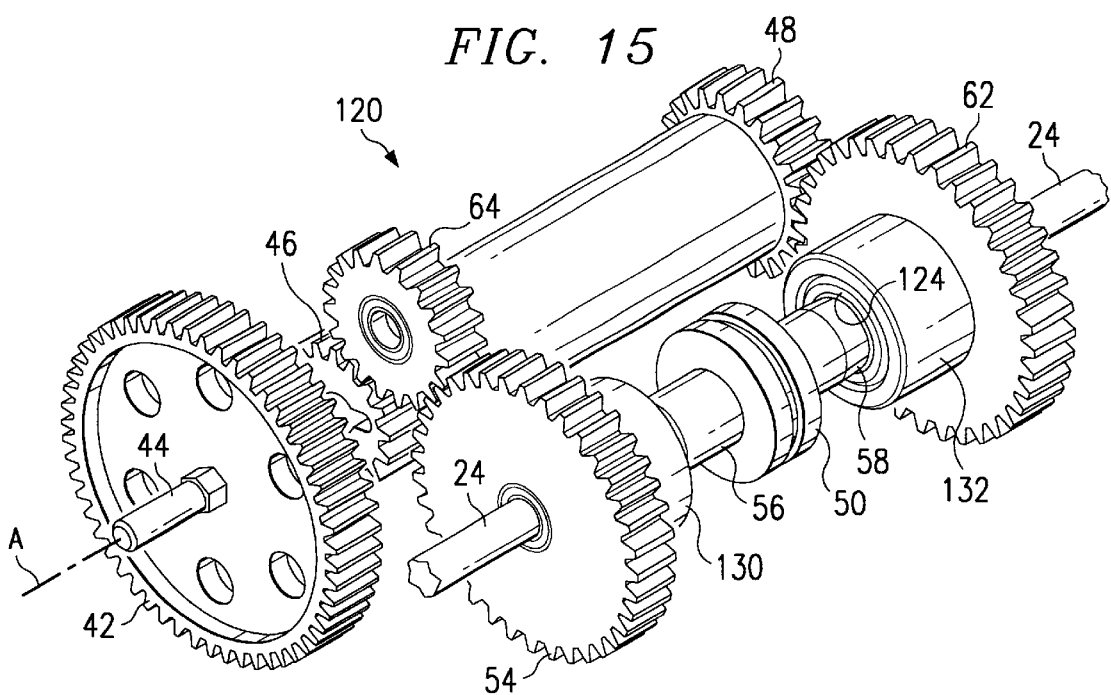
FIG. 15 is a perspective view of a power transmission which includes a pair of free-wheeling one-way clutch assemblies.
Figure 16:
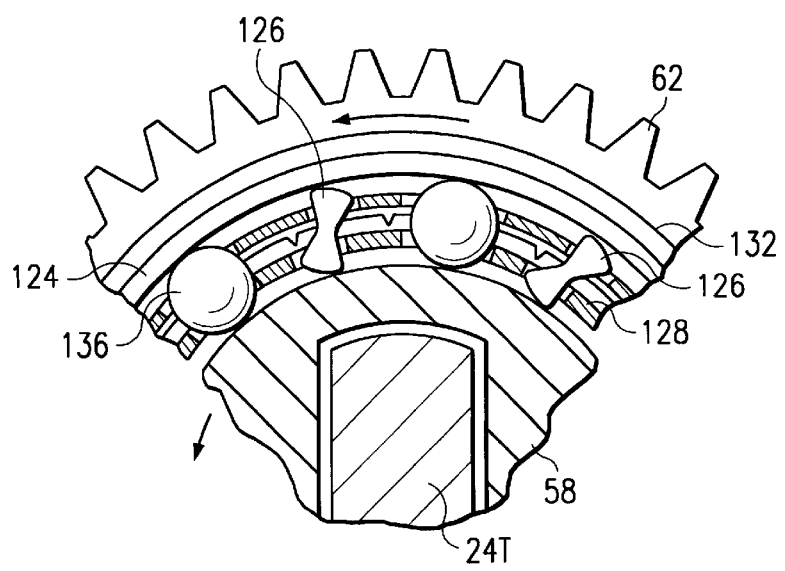
FIG. 16 is a sectional view, partially broken away, of the free-wheeling one-way clutch assembly; and, FIG. 17 is an exploded perspective view of the power transmission shown in FIG. 16.
Figure 17:
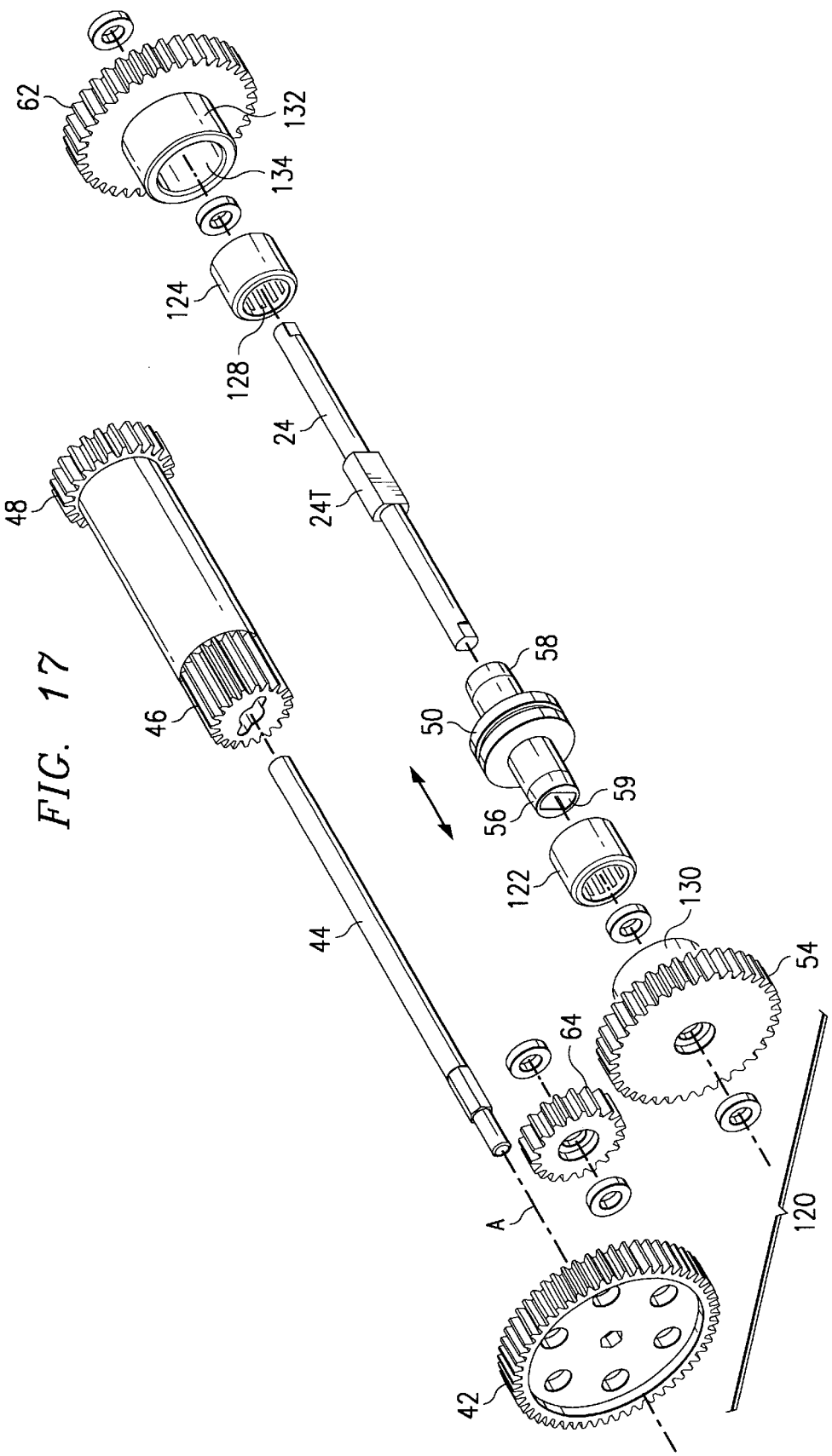

Referring now to FIG. 15, FIG. 16 and FIG. 17, the rotary torque output of the internal combustion engine 22 is applied to the main drive shaft 24 through a transmission assembly 120 which utilizes one-way, direct clutch assemblies 122, 124. The transmission assembly 120 is constructed substantially identically to the transmission assembly 38, except that intertial clutch elements, torque transfer pins and bias springs are not utilized. In this alternative embodiment, each one-way clutch includes clutch slips 126 (FIG. 16) that are mounted for pivotal movement on a roller bearing race 128. The one-way slip clutches 122, 124 are mounted within collars 130, 132 that are rigidly attached to the forward drive spur gear 54 and to the reverse drive spur gear 62, respectively. Each clutch collar 130, 132 surrounds a cylindrical pocket 134 in which each clutch assembly 122, 124 is received.

Referring to FIG. 16 and FIG. 17, when the clutch bell 50 is shifted to the reverse drive position, the clutch bell insert collar 58 is inserted into the clutch pocket of the one-way clutch 124. The pivotal slips 126 provide one-way wedging, torque transfer engagement between the clutch bell insert collar 58 and the spur coupling collar 132 in response to counter-clockwise rotation of the main drive shaft 24. The pivotal slips 126 disengage to permit free wheeling rotation of the clutch bell insert collar 58 on the roller bearings 136 in response to clockwise rotation of the main drive shaft.

Upon reverse gear engagement, as shown in FIG. 15, the shaft insert collar 58 carried by the clutch bell 50 engages the pivotal clutch slips 126 (FIG. 16), thereby releasably connecting the reverse spur gear 62, the reverse clutch 124 and the clutch bell 50 into one-way reverse drive, torque transfer engagement with the main drive shaft 24. The output torque of the engine 22 is reversed by the drive pinion 48 which is meshed with the reverse spur gear 62. According to this arrangement, counterclockwise rotation of the torque shaft 44 is converted into clockwise rotation of the drive shaft 24 and drive wheels, thereby producing reverse (R) rotation of the drive wheels.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

I claim:

1. In a scale model vehicle including a chassis, a main drive shaft mounted on the chassis for clockwise and counterclockwise rotation, drive wheels coupled to the main drive shaft for propelling the vehicle in forward and reverse directions, an internal combustion engine having a rotary power output shaft, and a transmission assembly coupled to the rotary power output shaft for transmitting torque from the engine to the main drive shaft, the transmission assembly comprising:

a first clutch coupled to the main drive shaft for transmitting torque in a clockwise direction;

a first spur gear attached to the first clutch;

a second clutch coupled to the main drive shaft for transmitting torque in a counterclockwise direction;

a second spur gear attached to the second clutch; and, a clutch bell coupled in torque transmitting engagement with the main drive shaft, the clutch bell being movable along the main drive shaft to a forward drive position in which the clutch bell is engagable with the first clutch for transmitting torque to the main drive shaft in the clockwise direction, and movable to a reverse drive position in which the clutch bell is engagable with the second clutch for transmitting torque to the main drive shaft in the counterclockwise direction;

a first pawl mounted on the first clutch for pivotal movement from a radially retracted position to a radially extended position;

a second pawl mounted on the second clutch for pivotal movement from a radially retracted position to a radially extended position; and first and second bias springs coupled to the first and second pawls, respectively, for urging the pawls toward the retracted positions and yieldably opposing radial extension of the first pawl and second pawl, respectively.

2. The combination as set forth in claim 1, including:

a torque transfer shaft mounted on the chassis for rotation about a longitudinal axis;

a first pinion gear attached to the torque transfer shaft and coupled in torque transfer engagement with the first spur gear;

a second pinion gear attached to the torque transfer shaft; and an idler gear coupled in driving engagement with the second pinion gear and second spur gear.

3. The combination as set forth in claim 1, including:

at least one torque transfer pin attached to the clutch bell in a position enabling torque transfer engagement with the first pawl or the second pawl when the clutch bell is disposed in either the forward drive position or in the reverse drive position.

4. The combination as set forth in claim 1, wherein each bias spring comprises a torsion spring.

5. The combination as set forth in claim 1, including:

servo-apparatus coupled to the clutch bell for moving the clutch bell along the main drive shaft to the forward drive position and to the reverse drive position.

6. In a scale model vehicle including a chassis, a main drive shaft mounted for clockwise and counterclockwise rotation on the chassis, drive wheels coupled to the main drive shaft for propelling the vehicle in forward and reverse directions of travel, an internal combustion engine having a rotary power output shaft, and a transmission assembly including torque transfer means coupled to the rotary power output shaft for movement to a first drive position enabling the transmission of torque from the engine to the main drive shaft in a direction of rotation corresponding to the forward direction of travel, and for movement to a second drive position enabling the transmission of torque from the engine to the main drive shaft in a second direction of rotation corresponding to the reverse direction of travel, the improvement comprising:

inertial lock-out apparatus engagable with the torque transfer means for opposing movement of the torque transfer means from one drive position to the other drive position in response to operation of the engine at or above a predetermined engine rpm;

said inertial lock-out apparatus comprising:
  a pawl disposed for pivotal movement from a non-interfering, torque transfer enabling position to a lock-out position in which the pawl is disposed in interfering engagement with the torque transfer means, thereby preventing torque transfer; and
  a bias spring coupled to the torque transfer means and to the pawl for urging the pawl toward the enabling position yieldably opposing pivotal movement of the pawl to the lock-out position.

* * * * *